(12) United States Patent
Melle

(10) Patent No.: US 8,474,482 B2
(45) Date of Patent: Jul. 2, 2013

(54) PLUMBING SHUTOFF OR SWITCHING VALVE

(75) Inventor: Fabian Melle, Durbach (DE)

(73) Assignee: Hansgrohe SE, Schiltach (DE)

( * ) Notice: Subject to any disclaimer, the term of this patent is extended or adjusted under 35 U.S.C. 154(b) by 523 days.

(21) Appl. No.: 12/695,402

(22) Filed: Jan. 28, 2010

(65) Prior Publication Data

US 2010/0193721 A1 Aug. 5, 2010

(30) Foreign Application Priority Data

Feb. 2, 2009 (DE) .......................... 10 2009 008 194

(51) Int. Cl.
*F16K 11/02* (2006.01)

(52) U.S. Cl.
USPC ............ 137/625.11; 137/625.12; 137/625.13; 137/625.15; 251/230; 251/229

(58) Field of Classification Search
USPC ............. 137/625.11, 625.12, 625.13, 625.15; 251/229, 230
See application file for complete search history.

(56) References Cited

U.S. PATENT DOCUMENTS

| | | | | |
|---|---|---|---|---|
| 1,375,205 A | * | 4/1921 | Budzinsky | 137/625.15 |
| 3,018,788 A | * | 1/1962 | Perlis | 137/331 |
| 3,124,162 A | * | 3/1964 | Cameron | 137/625.11 |
| 3,220,695 A | * | 11/1965 | Jones et al. | 251/263 |
| 3,333,815 A | * | 8/1967 | Jones et al. | 251/263 |
| 3,369,565 A | * | 2/1968 | Haggard, Jr. | 137/625.11 |
| 3,405,733 A | * | 10/1968 | Hansen | 137/624.14 |
| 3,459,208 A | * | 8/1969 | Clyde | 137/119.03 |
| 3,524,470 A | * | 8/1970 | Kah, Jr. et al. | 137/624.18 |
| 3,620,253 A | * | 11/1971 | Walker et al. | 137/625.11 |
| 3,642,022 A | * | 2/1972 | Kirby | 137/119.03 |
| 3,785,391 A | * | 1/1974 | Miller | 137/119.03 |
| 3,924,652 A | * | 12/1975 | Kah, Jr. | 137/119.03 |
| 3,987,819 A | * | 10/1976 | Scheuermann | 137/637.3 |
| RE29,252 E | * | 6/1977 | Miller | 137/119.03 |
| 4,065,982 A | * | 1/1978 | Wenger | 74/473.11 |
| 4,077,424 A | * | 3/1978 | Ehret et al. | 137/119.07 |
| 4,109,670 A | * | 8/1978 | Slagel | 137/119.03 |
| 4,178,963 A | * | 12/1979 | Riefler et al. | 137/624.18 |
| 4,456,222 A | * | 6/1984 | Shen | 251/230 |
| 5,022,426 A | * | 6/1991 | Fischer | 137/119.03 |
| 5,105,851 A | * | 4/1992 | Fogelman | 137/625.11 |
| 5,261,451 A | * | 11/1993 | Spencer | 137/554 |

(Continued)

FOREIGN PATENT DOCUMENTS

| | | |
|---|---|---|
| DE | 1750380 | 2/1971 |
| DE | 2147187 | 4/1973 |

(Continued)

OTHER PUBLICATIONS

European Search Report in EP 10152224.1, Jun. 8, 2010.

*Primary Examiner* — John Rivell
*Assistant Examiner* — Minh Le
(74) *Attorney, Agent, or Firm* — Duane Morris LLP

(57) ABSTRACT

A switching valve is proposed that switches between at least two different outlets with the aid of a valve closing body and a valve seat. The valve contains an actuating device that can be actuated by the user. The actuating device acts on an advancing device that advances the valve closing body from a stable, discrete position into another stable, discrete position. The advancement can be caused either by the interaction of beveled surfaces or by means of the flow of water.

18 Claims, 5 Drawing Sheets

U.S. PATENT DOCUMENTS

Figure 1:
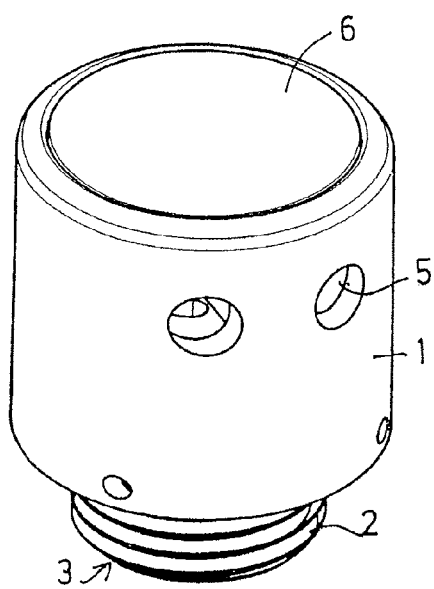

| | | | |
|---|---|---|---|
| 5,316,042 A * | 5/1994 | Lim et al. | 137/625.11 |
| 5,421,552 A * | 6/1995 | Wang et al. | 251/230 |
| 5,704,397 A * | 1/1998 | Lu | 137/630.15 |
| 5,727,591 A * | 3/1998 | Doll | 137/554 |
| 6,189,556 B1 * | 2/2001 | Blake et al. | 137/119.07 |
| 6,276,659 B1 * | 8/2001 | Wang | 251/58 |
| 6,942,195 B2 * | 9/2005 | Kao | 251/339 |
| 8,028,356 B2 * | 10/2011 | Kao et al. | 4/678 |
| 2001/0035516 A1 * | 11/2001 | Nichols et al. | 251/368 |
| 2004/0261865 A1 * | 12/2004 | Tang | 137/625.11 |

FOREIGN PATENT DOCUMENTS

| | | |
|---|---|---|
| DE | 2652584 B2 | 6/1977 |
| DE | 10130611 C1 | 1/2003 |
| DE | 102006018673 | 10/2007 |
| DE | 102007026828 A1 | 11/2008 |
| GB | 949108 | 2/1964 |

* cited by examiner

PLUMBING SHUTOFF OR SWITCHING VALVE

The invention relates to a plumbing valve that can be used for example in plumbing fittings. The valve can be both a shutoff valve as well as a switching valve between two or more outlets.

With plumbing fittings, the problem frequently arises that one needs to switch between two outlets, for example, between an outlet leading to a tub and outlet leading to a hand-held shower nozzle. Switching between two outlets can also be provided within a hand-held shower nozzle. Fittings are known that have a valve actuated using a lever or a switching button. Levers that are swung are known as well as buttons that are either pressed and pulled or rotated.

The invention is based on the problem of proposing a valve with a simple space-saving design that can be very easily used to shut off an outlet or switch between these outlets when there is a plurality of outlets.

To solve this problem, the invention proposes a plumbing valve having the features cited in claim 1. Developments of the invention are the subject matter of subclaims.

Whereas the switching in previously-known switching valves is caused by swinging a lever, i.e., back and forth, shutting off or switching is now caused by cyclical advancing. This mode of actuation can be easier, especially with wet or soapy hands, than swinging a lever or pulling a pull button.

While advancing, there are also no end positions contacted by a valve element which can cause appearances of wear from continuous misuse.

In a development according to the invention, the valve closing body can have a through-hole aligned with an opening in the valve seat in one of the possible stable positions. In a second possible stable position, no such alignment exists, and the opening in the valve seat is closed.

In a development according to the invention, the advancing device can be designed such that the valve closing body is first lifted from the valve seat, then moved toward the next possible position and lowered onto the valve seat.

It is however also possible and proposed by the invention that the valve seat body is not initially lifted, but rather that it executes a simpler movement, i.e., it is rotated directly from one position to the following positions.

In another development of the invention, the valve closing body is contacted in the direction of the valve seat, especially by spring. By selecting the spring, the force with which the valve closing body is contacted can be adjusted.

It has already been mentioned that the valve seat has an opening which can be opened or closed by the valve closing body. A development of the invention can provide that the valve seat has a through-hole leading to the outlet in the housing. Given a plurality of separate outlets in housing, the valve seat can accordingly have one opening for each outlet.

In a development of the invention in which the valve has a plurality of separate outlets, the valve can be designed such that it can open and close each of the outlets separately and can also open combinations of at least two outlets together. This makes it possible for e.g. two outlets in a plumbing fitting to be opened together.

In a development of the invention, the advancing device can be designed such that it advances the valve closing body via the interaction of beveled surfaces. In this case, switching between a plurality of outlets or shutting off perhaps the only outlet can also be possible when no water is flowing. The user can therefore specify the outlet for example before opening an upstream flow control valve.

It is however also possible and is proposed by the invention for the advancing device to also use the water flow to advance the valve closing body. This can be designed such that the valve closing body is moved out of its stable position by actuating its actuating element, and then the water flow is used to move the valve closing body into the next possible stable position. The valve can have a turbine that contacts the valve closing body. In particular, this turbine can be located directly on the valve closing body.

To precisely define the different possible stable positions of the valve closing body, the invention can provide that they are defined by the engagement of projections in recesses. Beveled surfaces can also be located on these projections and on the formations of valve neighboring the recesses, said beveled surfaces causing the valve closing body to advance or move further.

The advancement of the valve closing body can possibly be a back and forth movement of the valve closing body. The invention however proposes a development in which the valve closing body always advances in the same direction.

In particular, it can be particularly advantageous for the movement of the valve closing body to be a rotary movement, especially a rotary movement about a fixed axis such that the different, stable positions of the valve closing body are identified by a different angular position. Rotating the valve closing body is particularly suitable for always advancing the valve closing body in the same direction.

A development according to the invention can provide that the valve closing body is designed as a plate element that interacts with a partition in the valve housing. The passages which lead to the outlets are then formed in this partition.

It can also be provided for chambers to be formed downstream from the partition between the partition and the outlets, the outlets leading from said chambers.

In particular, the advancing device can advantageously be actuated by a pushbutton. The movement of the valve closing body can either be purely a translatory movement, i.e., a rotary movement, or be composed of a lifting movement and a rotary movement.

Figure 2:
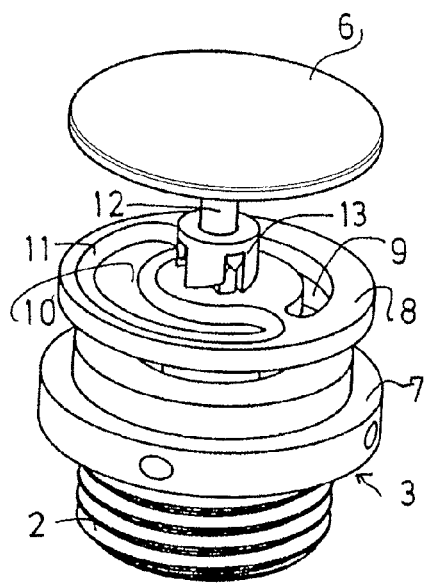
Figure 3:
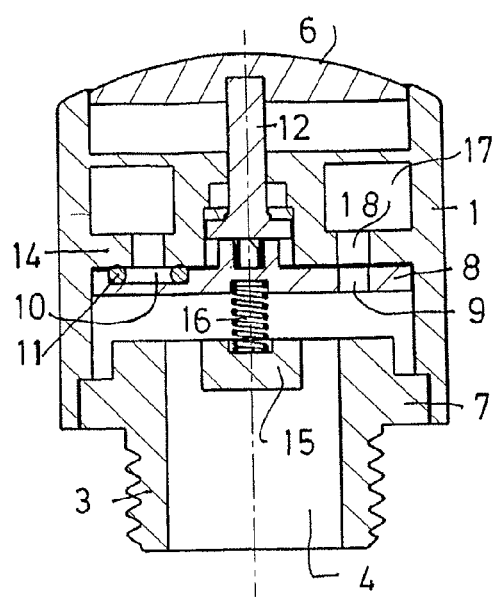
Figure 4:
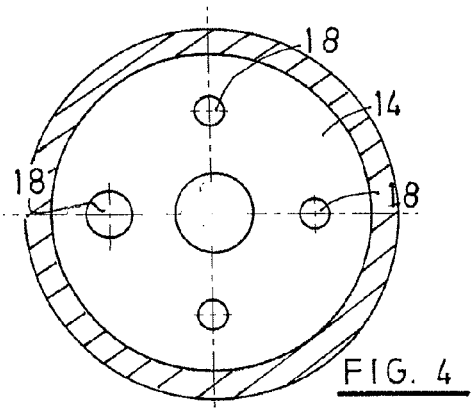
Figure 5:
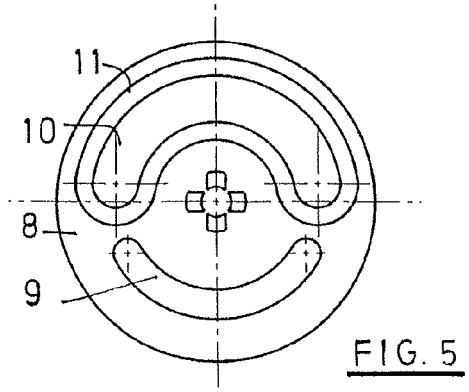
Figure 6:
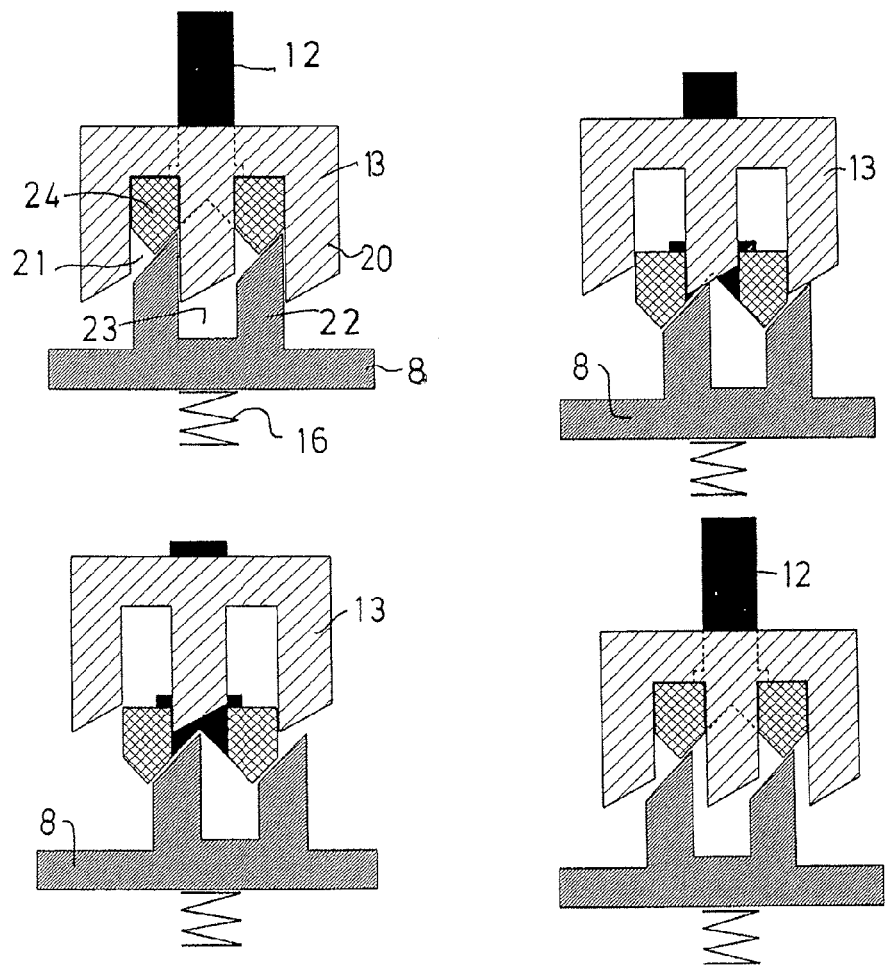
Figure 11:
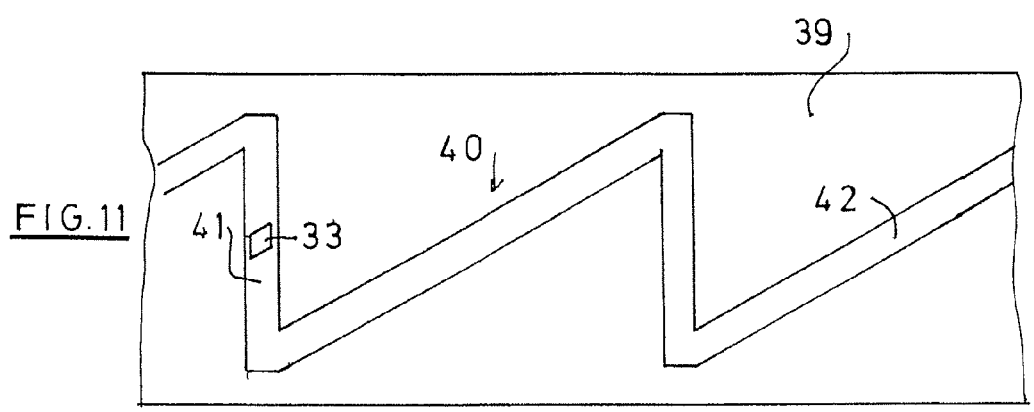
Figure 8:
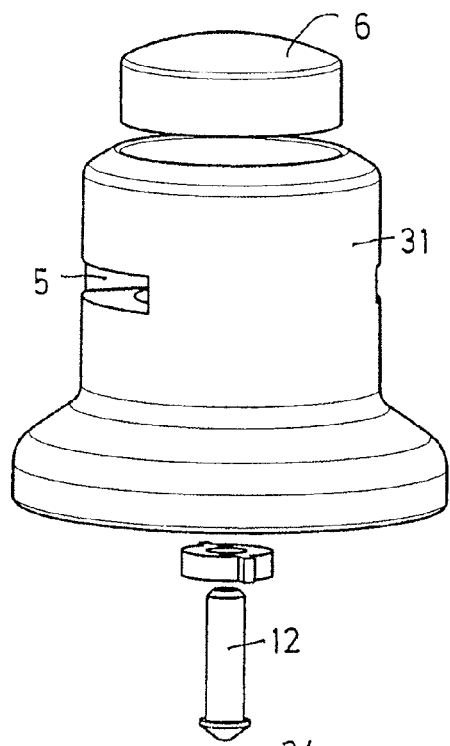
Figure 8:
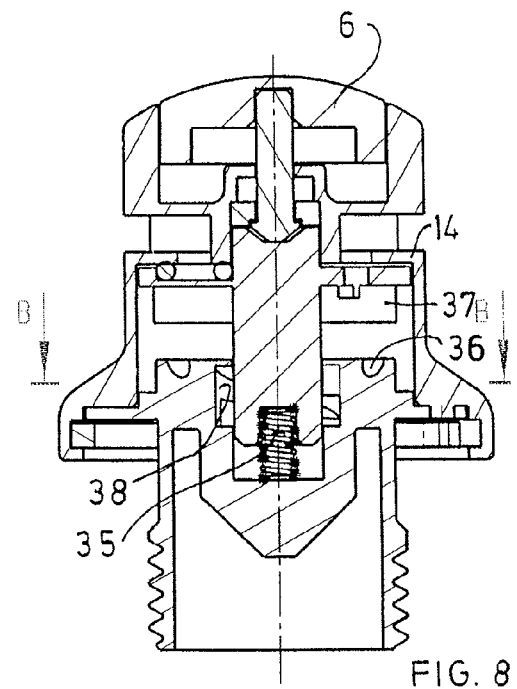
Figure 7:
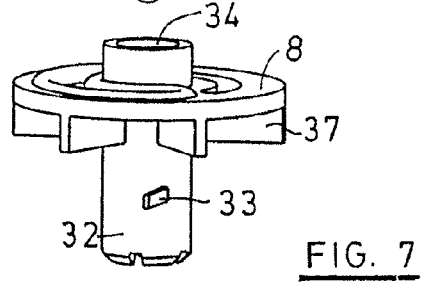
Figure 9:
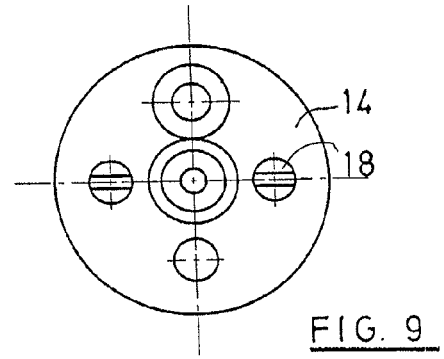
Figure 10:
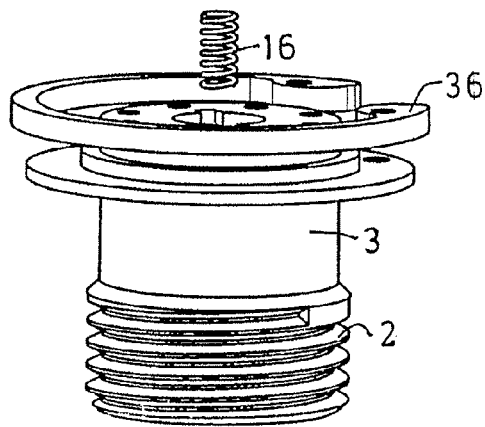
Figure 10:
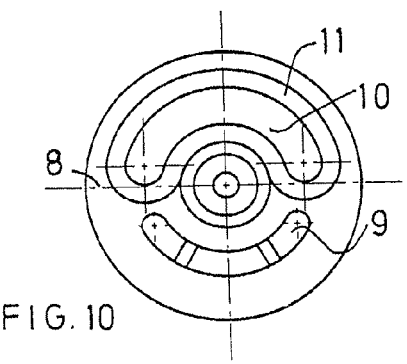
Figure 12:
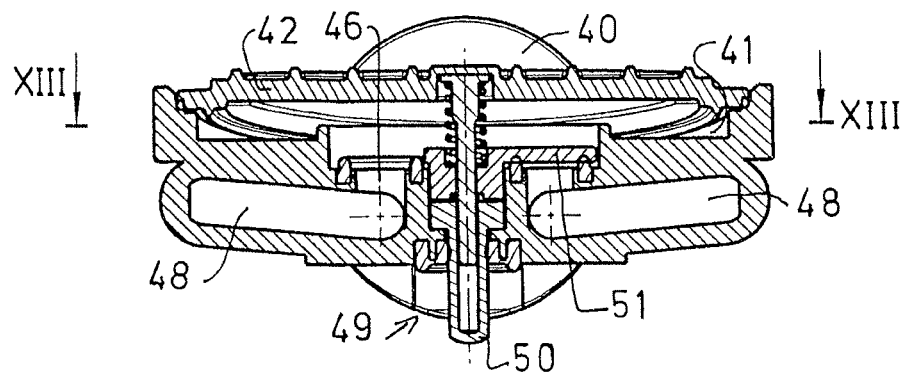
Figure 13:
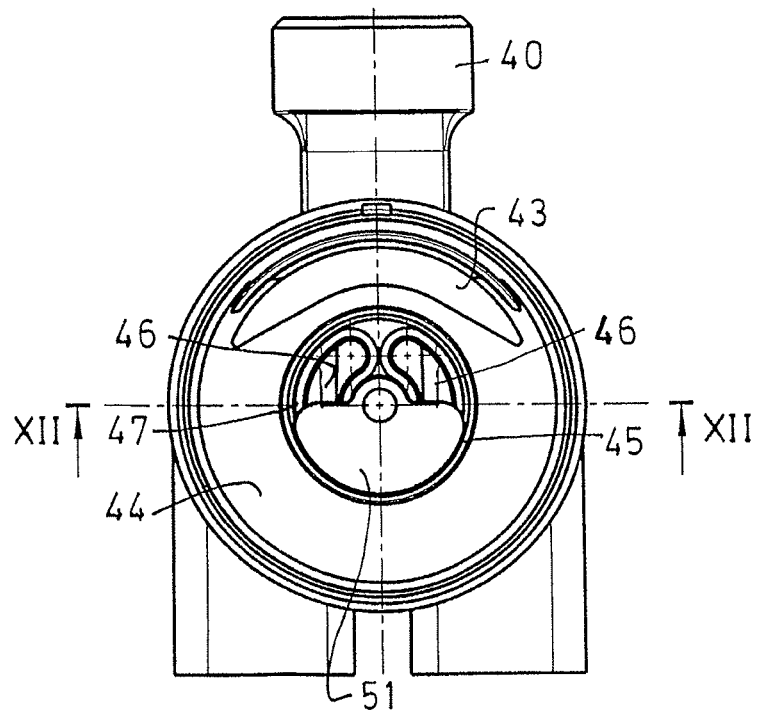
Figure 14:
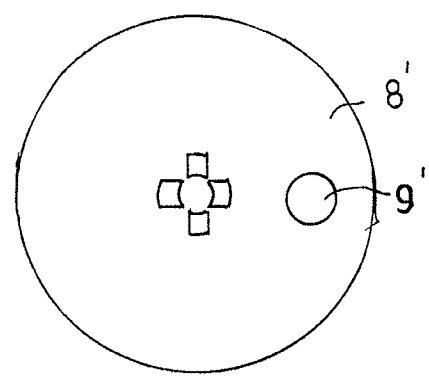

Additional features, details and preferences of the invention are found in the claims and abstract (the wording of both being made the content of the description by means of reference), the following description of preferred embodiments of the invention, and the drawing. The following are shown:

FIG. 1 Perspective view of a valve seat according to the invention specified as an insert for a fitting;

FIG. 2 Perspective of a few parts of the valve in FIG. 1;

FIG. 3 An axial section of the valve in FIGS. 1 and 2;

FIG. 4 A front view of a partition in the valve housing;

FIG. 5 A plan view of the valve closing body of the valve;

FIG. 6 Simplified schematic for showing the advancing device;

FIG. 7 The individual parts of a valve of a second embodiment;

FIG. 8 An axial section of the valve from FIG. 7;

FIG. 9 A view of a partition in the valve housing similar to FIG. 4;

FIG. 10 View of the valve closing body of the valve in FIG. 7;

FIG. 11 Pattern of the movement of the valve closing body of the valve in FIG. 7;

FIG. 12 A section of another embodiment of a switching valve;

FIG. 13 A plan view of the valve from FIG. 12 with the cover removed;

FIG. 14 An embodiment of the valve closing body altered in comparison to FIG. 5.

The valve in FIG. 1 designed as an insert for a plumbing fitting contains a valve housing 1 in the form of a cylinder. On the bottom, a projection 3 is formed with an outer thread 2 by means of which the valve can be screwed into a plumbing fitting as an insert, or into the housing of a handheld shower nozzle. The inside of the projection 3 forms the inlet for the water to be distributed by the valve with a passage 4. Two outlet openings 5 end in the lateral surface of the valve housing 1, and the valve is used to switch between them. For example, one outlet opening 5 is intended for the drain of a tub, and another outlet opening 5 is intended for a shower. A plate 6 of a pushbutton forms the top termination of the housing 1, the pushbutton being designed slightly curved and being located within the top end of the housing 1 with a slight gap.

FIG. 2 shows the valve from FIG. 1 without the valve housing 1. The projection 3 having a thread 2 contains a flange 7 that is connected to the bottom edge of the housing 1 when the projection 3 is inserted in the housing 1.

Another element located in the housing is a valve closing body 8 that is designed as a circular, flat plate and has an arced passage 9. Formed in the side opposite the passage 9 is a recess 10 with an edge having a seal 11. The seal 11 attached to the valve closing body can alternatively be located on housing or the partition 14.

The pushbutton with the plate 6 is another element located in the housing 1. Located on the bottom of the plate 6 is a shaft 12 that has a plurality of protrusions 24. A hub 13 that can move slightly is mounted on the shaft 12, and it has protrusions and recesses between the protrusions, wherein the bottom ends of the protrusions have bevels.

FIG. 3 shows an axial section of the valve. A partition 14 is formed in the valve housing 1 as a single piece, and the valve closing body 8 lies on the side pointing downward in FIG. 3. In the middle of the projection 3, a hub 15 is formed that has a recess in its side facing the valve body 8. A pressure spring 16 is inserted here that presses the valve closing body 8 against the partition 14. The outer diameter of the valve closing body 8 approximately corresponds to the inner diameter of the valve housing.

Two chambers 17 are formed on the side of the partition 14 facing away from the valve closing body 8, and each chamber 17 is connected to an outlet 5 for the passage of fluid. At least one passage 18 in the partition 14 leads into each chamber 17. In the position shown in FIG. 3, the position of the opening 9 of the valve closing body 8 is such that it is aligned with the passage 18, which leads into one of the two chambers 17. This means that the water can now flow into the right chamber 17 in FIG. 3 and from there through one of the two outlets 5.

In a cross-section of the valve housing 1, FIG. 4 shows a view of the partition 14 with a plurality of passages 18.

FIG. 5 shows a plan view of the valve closing body 8, i.e., from the top, from FIG. 2. If the valve closing body is placed on the partition 14, one can see that it is possible to align combinations of passages 18 with passage 9. Since in each case two passages are connected with a chamber 17 and hence to an outlet 5, the two outlets 5 can therefore be controlled both together and separately.

It is also possible for the valve closing body in the form of a disk 8' to only have a single opening 1' for example a circular hole. Reference is made in this regard to FIG. 14. This single opening 9' can optionally be brought into alignment with one passage or no passage 18 in the partition 14. This can create shutoff positions. With small adjusting steps of the advancing device, for example by means of a smaller division or corresponding hole shapes, partial openings of a hole can also be created.

The type of movement of the valve closing body 8 will now be explained with reference to schematic FIG. 6. Pins pointing downward and gaps 21 between the pins are formed on the foot 13 that is permanently installed in the housing. Pin-like protrusions 22 with gaps between them are also formed on the top of the valve closing by the 8. The top ends of the pins 22 of the valve closing body 8 are angled like the bottom ends of the protrusions 20 of the foot 13. Double-wedge formations 24 that are connected with the shafts 12 of the pushbutton are guided in the recesses 21. If the pushbutton is pressed downward from the position at the top left in FIG. 6, the valve closing body 8 is also pressed downward against the effect of the spring 16. Once the tips of its protrusions 22 pass the tip of protrusions 20, the formations 24 move the pins 22 to the right. If the pushbutton is then released, the spring 16 moves the formations 24 and hence the pushbutton back into the initial position by means of the protrusions 22 of the valve closing body 8, and into a position in which each protrusion 22 is located in the next gap 21. These different stages are shown in the four individual drawings in FIG. 6. Such advancing devices are known in many applications.

The valve shown in the following figures is similarly designed, wherein its exterior is designed somewhat differently. Two slots are formed in the housing and 31 as outlet openings 5 that are diametrically opposed. Actuation is again provided by a pushbutton with a plate 6 that is located at the top end of the housing 31. On its top, the valve closing body 8 has the same shape as the valve closing body 8 in FIG. 5. In this instance, the valve closing body contains a shaft 32 in the middle with a cam 33 on its outside. On its face pointing upward in FIG. 7, the shaft 32 has a recess 34, and it also has a recess 35 in its bottom. The pressures spring 16 engages in the recess 35. The shaft 12 of the actuating button engages in recess 34 in the surface.

A snap ring 36 shown in FIG. 7 serves to hold the projection 3 in the housing.

In an assembled state, the pressures spring 16 held in a hub of the projection 3 presses the shaft 32 and hence the valve closing body 8 against the bottom of the partition 14 such that the valve positions are similar to those in the prior embodiment. The projection 3 in this embodiment does not have a completely penetrating passage; instead, it has a plate on its end facing the inside of the valve housing 31 through which channels lead, the outputs 36 of which are shown in FIG. 8. These channels exit at an angle to the face.

Radial vanes 37 forming a turbine are located on the bottom of the plate of the valve closing body 8 having the openings 9. The channels exiting at an angle generate a flow of water that contacts the vanes 37 of the turbine.

The cam 33 formed on the outside of the shaft 32 of the valve closing body 8 is guided in a groove in the wall of a chamber 38 in the projection 3 surrounding the shaft 32. A pattern of this wall 39 of this chamber 38 is shown in FIG. 11. The groove 40 has axial sections 41 and 42. The orientation of the pattern in FIG. 11 corresponds to the depiction in FIG. 8. This means that the top in FIG. 8 is also the top in FIG. 11. The cam 33 is guided in the groove 40. If the actuating button is pressed with the aid of the plate 6, the valve closing body 8 is shoved downward against the effect of the spring 16; the valve closing body can initially only move axially since the cam 38 is guided in the axial part 41 of the groove 40. At the same time, the flow of water that runs at an angle from the recesses 36 of the channels acts on the vanes 37 of the turbine. Once the cam 33 reaches the bottom end of the axial section 41 of the groove of 40, the flow of water acts to rotate the valve closing body 8. The cam 33 is thereby guided in the angled part 42 of the groove 40 until it reaches the top end of the angled part 42. This is the next stable position of the valve closing body 8 in which it rests.

FIG. 12 shows a section corresponding to FIGS. 3 and 8 of another embodiment of a plumbing valve proposed by the invention. This plumbing valve has an inlet 40 at the top in FIG. 13 that can also be seen at the rear in FIG. 12. The inlet 40 leads into the inner chamber 41 of the valve housing. This inner chamber 41 is closed at the top in FIG. 12 by a cover 42.

A sickle-shaped inlet chamber 43 (see FIG. 13) extending to the floor of the valve housing is formed in the valve housing directly after the inlet 40. The already mentioned inner chamber 41 has an annular floor 44 that is delimited to the inside by an edge skirt 45. Within this edge skirt 45 extending along a cylinder, there is a recess in the floor of which two arced passages 46 are formed. Both passages 46 are surrounded by a seal of 47. Each of the two passages 46 leads to its own outlet channel 48, a cross-section of which can be seen in FIG. 12. FIG. 13 shows how the outlet channels extend out of the valve housing.

The advancing device 49 is located concentrically in the recess within the edge skirt 45, and it works in a manner similar to that in the prior embodiments. Pressing the actuating element in the form of a pin 50 (FIG. 12, bottom) advances a valve plate 51 whose shape approximately corresponds to the shape of the two passages 46. In the depiction in FIG. 12, one of the two passages 46 is covered by the valve plate 51 and thereby closed, whereas the passage 46 on the left in FIG. 12 is open. The advancing device is designed such that the valve plate 51 advances 90° in each case. FIG. 13 shows the valve plate 41 in a state in which each of the two passages 46 is half opened and half closed. Upon advancing which always occurs in the same direction, one of the two passages 46 is completely closed in the next state whereas the other is completely open.

The possible modes of advancing the valve closing body in the form of the valve plate 51 can be explained with reference to FIG. 13. There are two passages corresponding to two outlets in the valve housing. In the simplest case, the valve closing body can have two possible positions, wherein in any position, one passage is completely open and one passage is completely closed. In the following example, the valve closing body has four positions, wherein one position is completely open for each passage, one position is half opened, and one is completely closed. It would also be possible to design the advancing device such that the valve plate 51 is advanced 45° each case. Given a different arrangement of the passages, it is also conceivable for a valve closing body to have a position in which both passages are closed. It is likewise possible for the valve closing body to have a position in which both passages are completely open.

A switching valve is proposed that switches between at least two different outlets by means of a valve closing body and a valve seat. The valve contains an actuating device that can be actuated by the user. The actuating device acts on an advancing device that advances the valve closing body from one stable, discreet position into another stable, discreet position. Advancement can occur either via the interaction of beveled surfaces or by means of the water flow.

What is claimed is:

1. A plumbing valve for shutoff and/or switching, comprising:
    a valve housing,
    an inlet leading into the valve housing,
    at least one outlet leading out of the valve housing,
    a valve that acts between the inlet in the valve housing and the outlet from the valve housing,
    the valve having a valve closing body that has discrete, stable positions,
    a stepwise advancing device configured for stepwise moving the valve closing body between the stable positions,
    wherein the valve closing body is urged in a direction toward a valve seat,
    an actuating device for the advancing device, including a pushbutton, configured for moving the valve closing body, and,
    wherein the valve closing body has at least one passage that is brought into alignment with an opening in the valve seat in one of the discrete, stable positions.

2. The plumbing valve according to claim 1, wherein the advancing device is configured such that the valve dosing body is lifted from the valve seat by operation of the pushbutton, advanced, and again lowered onto the valve seat.

3. The plumbing valve according to claim 1, wherein the valve seat has a passage leading to the outlet in the housing.

4. The plumbing valve according to claim 1, wherein the advancing device advances the valve closing body via an interaction of beveled surfaces.

5. The plumbing valve according to claim 1, wherein the discrete, stable positions of the valve closing body are defined by engagement of protrusions in recesses.

6. The plumbing valve according to claim 1, wherein the advancing device moves the valve closing body in a same direction.

7. The plumbing valve according to claim 1, wherein the valve dosing body comprises a plate that interacts with a partition in the valve housing.

8. The plumbing valve according to claim 1, wherein at least one said outlet in the housing leads out of a chamber formed in the housing.

9. A plumbing valve for shutoff and/or switching comprising:
    a valve housing,
    an inlet leading into the valve housing,
    at least one outlet leading out of the valve housing,
    a valve that acts between the inlet in the valve housing and the outlet from the valve housing,
    the valve having a valve closing body that has discrete, stable positions,
    a stepwise advancing device configured for stepwise moving the valve closing body between the stable positions,
    wherein the valve closing body is urged in a direction toward a valve seat,
    an actuating device for the advancing device, including a pushbutton, configured for moving the valve closing body,
    a plurality of said outlets leading out of the valve housing, and wherein the valve is configured to open each of the outlets separately and in combinations of at least two said outlets.

10. The plumbing valve according to claim 9, wherein the discrete, stable positions of the valve closing body are rotary positions.

11. The plumbing valve according to claim 10, wherein movement of the valve dosing body between the discrete, stable positions includes a lifting movement and a translatory rotary movement perpendicular to the lifting movement.

12. The plumbing valve according to claim 10, wherein movement of the valve dosing body is a purely translatory movement.

13. The plumbing valve according to claim 9, wherein the advancing device enables intermediate positions of the valve dosing body, and wherein the valve dosing body in the intermediate positions is effective for at least one of partially opening and dosing at least one of the outlets, opening a plurality of said outlets, and dosing all of said outlets.

14. The plumbing valve according to claim 9, wherein the advancing device obtains intermediate positions of the valve dosing body, and wherein the valve dosing body in the intermediate positions is effective for partially opening and dosing at least one of the outlets, opening a plurality of said outlets, and dosing all of said outlets.

15. A plumbing valve for shutoff and/or switching, comprising:
   a valve housing,
   an inlet leading into the valve housing,
   at least one outlet leading out of the valve housing,
   a valve that acts between the inlet in the valve housing and the outlet from the valve housing,
   the valve having a valve closing body that has discrete, stable positions,
   a stepwise advancing device configured for stepwise moving the valve closing body between the stable positions,
   wherein the valve closing body is urged in a direction toward a valve seat,
   an actuating device for the advancing device, including a pushbutton, configured for moving the valve closing body,
   wherein the advancing device moves the valve dosing body by a flow of water.

16. The plumbing valve according to claim 15, wherein the valve closing body has turbine vanes and forms a turbine.

17. A plumbing valve for shutoff and/or switching, comprising:
   a valve housing,
   an inlet leading into the valve housing,
   at least one outlet leading out of the valve housing,
   a valve that acts between the inlet in the valve housing and the outlet from the valve housing,
   the valve having a valve closing body that has discrete, stable positions,
   a stepwise advancing device configured for stepwise moving the valve closing body between the stable positions,
   wherein the valve closing body is urged in a direction toward a valve seat,
   an actuating device for the advancing device, including a pushbutton, configured for moving the valve closing body,
   wherein the housing has a plurality of outlets and the valve seat has at least one passage leading to each of the outlets.

18. The plumbing valve according to one of claim 1, 9, 15 or 17, wherein the valve dosing body is urged in the direction toward the valve seat by a spring.

* * * * *